United States Patent
Degner et al.

(10) Patent No.: US 10,270,364 B2
(45) Date of Patent: Apr. 23, 2019

(54) POWER CONVERTER WITH DEAD-TIME VARIATION TO DISPERSE DISTORTION

(71) Applicant: FORD GLOBAL TECHNOLOGIES, LLC, Dearborn, MI (US)

(72) Inventors: Michael W. Degner, Novi, MI (US); Chingchi Chen, Ann Arbor, MI (US); Jun Kikuchi, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 685 days.

(21) Appl. No.: 14/601,293

(22) Filed: Jan. 21, 2015

(65) Prior Publication Data

US 2016/0211773 A1    Jul. 21, 2016

(51) Int. Cl.
  *H02M 1/38*    (2007.01)
  *H02M 7/5387*    (2007.01)
  *H02P 9/10*    (2006.01)

(52) U.S. Cl.
  CPC ......... *H02M 7/53871* (2013.01); *H02M 1/38* (2013.01)

(58) Field of Classification Search
  USPC ........... 318/503, 254.1, 602, 400.17, 400.21, 318/400.26, 786
  See application file for complete search history.

(56) References Cited

U.S. PATENT DOCUMENTS

| | | | |
|---|---|---|---|
| 5,990,657 A | 11/1999 | Masaki et al. | |
| 6,535,402 B1 | 3/2003 | Ying et al. | |
| 7,151,406 B2 | 12/2006 | Labbé | |
| 7,187,149 B1 | 3/2007 | Balog, Jr. et al. | |
| 7,391,194 B2 | 6/2008 | Brown | |
| 7,589,506 B2 | 9/2009 | Brown | |

(Continued)

FOREIGN PATENT DOCUMENTS

| | | |
|---|---|---|
| JP | 02179277 | 12/1990 |
| JP | 03089868 | 4/1991 |
| JP | 07007967 | 1/1995 |

OTHER PUBLICATIONS

Lihua Chen et al, Dead-Time Elimination for Voltage Source Inverters, IEEE Transactions on Power Electronics, vol. 23, No. 2, Mar. 2008.

(Continued)

*Primary Examiner* — Bickey Dhakal
*Assistant Examiner* — Charles S Laughlin
(74) *Attorney, Agent, or Firm* — David B. Kelley; MacMillan, Sobanski & Todd, LLC (57) ABSTRACT

A power converter receives a DC supply voltage across a phase leg. The phase leg comprises an upper switching device and a lower switching device coupled across the DC link, wherein a junction between the upper and lower switching devices is configured to be coupled to a load. A gate driver is coupled to the phase leg activating the respective upper switching device according to an upper gate signal and activating the respective lower switching device according to a lower gate signal in response to a pulse-width modulation (PWM) control signal at a PWM frequency. The gate driver shuffles among a plurality of alternate paired sets of dead-time inserted signals. Each paired set of dead-time inserted signals corresponds to a different distortion of a current flowing in the load, so that overall distortion is dispersed.

8 Claims, 5 Drawing Sheets

(56) References Cited

U.S. PATENT DOCUMENTS

| | | |
|---|---|---|
| 7,615,887 B2 | 11/2009 | Stancu et al. |
| 7,659,679 B2 | 2/2010 | Raja et al. |
| 7,724,054 B2 | 5/2010 | Honda et al. |
| 8,289,010 B1 | 10/2012 | Fernald et al. |
| 8,520,420 B2 | 8/2013 | Jungreis et al. |
| 2005/0174076 A1* | 8/2005 | Katanaya .......... H02M 7/53873 318/400.28 |
| 2007/0249461 A1 | 10/2007 | Tsuji et al. |
| 2009/0278621 A1* | 11/2009 | Kris ................ H02M 1/38 332/109 |
| 2012/0112674 A1* | 5/2012 | Schulz ............... B60L 11/1803 318/400.09 |
| 2013/0069570 A1 | 3/2013 | Chen et al. |
| 2013/0088905 A1 | 4/2013 | Lee et al. |
| 2013/0200828 A1 | 8/2013 | Miller et al. |
| 2014/0042948 A1 | 2/2014 | Green et al. |
| 2014/0226369 A1 | 8/2014 | Kimura et al. |

OTHER PUBLICATIONS

Murai et al, Waveform Distortion and Correction Circuit for PWM Inverters with Switching Lag-Times, IEEE Transactions on Industry Applications, vol. IA-23, No. 5, Sep./Oct. 1987.

* cited by examiner

POWER CONVERTER WITH DEAD-TIME VARIATION TO DISPERSE DISTORTION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to power converters including inverters for an electric drive system of an electrified vehicle, and, more specifically, to selectively inserting a dead-time for controlling switching devices to avoid shoot-through without introducing any significant distortion in the output of the converter.

Electric vehicles, such as hybrid electric vehicles (HEVs), plug-in hybrid electric vehicles (PHEVs), and battery electric vehicles (BEVs), use inverter-driven electric machines to provide traction torque and regenerative braking torque. A typical electric drive system includes a DC power source (such as a battery pack or a fuel cell) coupled by contactor switches to a variable voltage converter (VVC) to regulate a main bus voltage across a main DC linking capacitor. An inverter is connected between the main buses for the DC link and a traction motor in order to convert the DC power to an AC power that is coupled to the windings of the motor to propel the vehicle. A second inverter may also be connected between the main bus and a generator (if present) to provide another power flow path from a prime mover, typically an internal combustion engine, to the DC link.

The inverters include transistor switching devices (such as insulated gate bipolar transistors, or IGBTs) connected in a bridge configuration including a plurality of phase legs. A typical configuration includes a three-phase motor driven by an inverter with three phase legs. An electronic controller turns the switches on and off in order to invert a DC voltage from the bus to an AC voltage applied to the motor, or to rectify an AC voltage from the generator to a DC voltage on the bus. In each case, the inverters are controlled in response to various sensed conditions including the rotational position of the electric machine and the current flow in each of the phases.

The inverter for the motor may preferably pulse-width modulate the DC link voltage in order to deliver an approximation of a sinusoidal current output to drive the motor at a desired speed and torque. Pulse Width Modulation (PWM) control signals applied to the gates of the IGBTs turn them on and off as necessary so that the resulting current matches a desired current.

Because each phase leg of the inverter has a pair of upper and lower switching devices connected across the DC link, it is important that both devices not be conducting (i.e., turned-on) simultaneously. Otherwise, the resulting "shoot-through" of the phase leg could result in damage to the switching devices. A short time interval during which both the upper and lower switching devices of a phase leg are turned off, known as a dead-time, is typically used in connection with PWM control of inverters in order to prevent shoot-through. In typical PWM control, a comparison of a PWM duty cycle with a PWM carrier signal identifies a transition time at which the output junction of a phase leg switches from being connected from one side of the DC link (i.e., positive or negative) to the other. Without dead-time insertion, one gate signal for the phase leg would change from On to Off at the same time that the other gate signal would change from Off to On. The most common form of dead-time insertion adds dead-time on both sides of the transition time, e.g., causes the "On" gate signal to go "Off" prior to the transition time and briefly delays the change of the "Off" gate signal to the "on" state. However, the insertion of dead-time has resulted in distortion of the output waveform delivered to the load and the introduction of control delays.

Efforts to avoid or reduce distortion by modifying the dead-time insertion have involved other penalties. For example, compensation circuits have been added to the switching devices in the phase legs which has resulted in increases in cost and manufacturing complexity. Other efforts have been directed to modifications to the inserted dead-times according to the direction of current flow within a particular phase leg, which has also resulted in additional cost and complexity.

SUMMARY OF THE INVENTION

In one aspect of the invention, a power converter comprises a DC link configured to receive a DC supply voltage. A phase leg comprising an upper switching device and a lower switching device is coupled across the DC link. A junction between the upper and lower switching devices is configured to be coupled to a load. A gate driver is coupled to the phase leg activating the upper switching device according to an upper gate signal and activating the lower switching device according to a lower gate signal in response to a pulse-width modulation (PWM) control signal at a PWM frequency. The gate driver shuffles among a plurality of alternate paired sets of dead-time inserted signals for the upper and lower gate signals. Each paired set of dead-time inserted signals corresponds to a different distortion of a current flowing in the load.

DETAILED DESCRIPTION OF PREFERRED EMBODIMENTS

Figure 1:
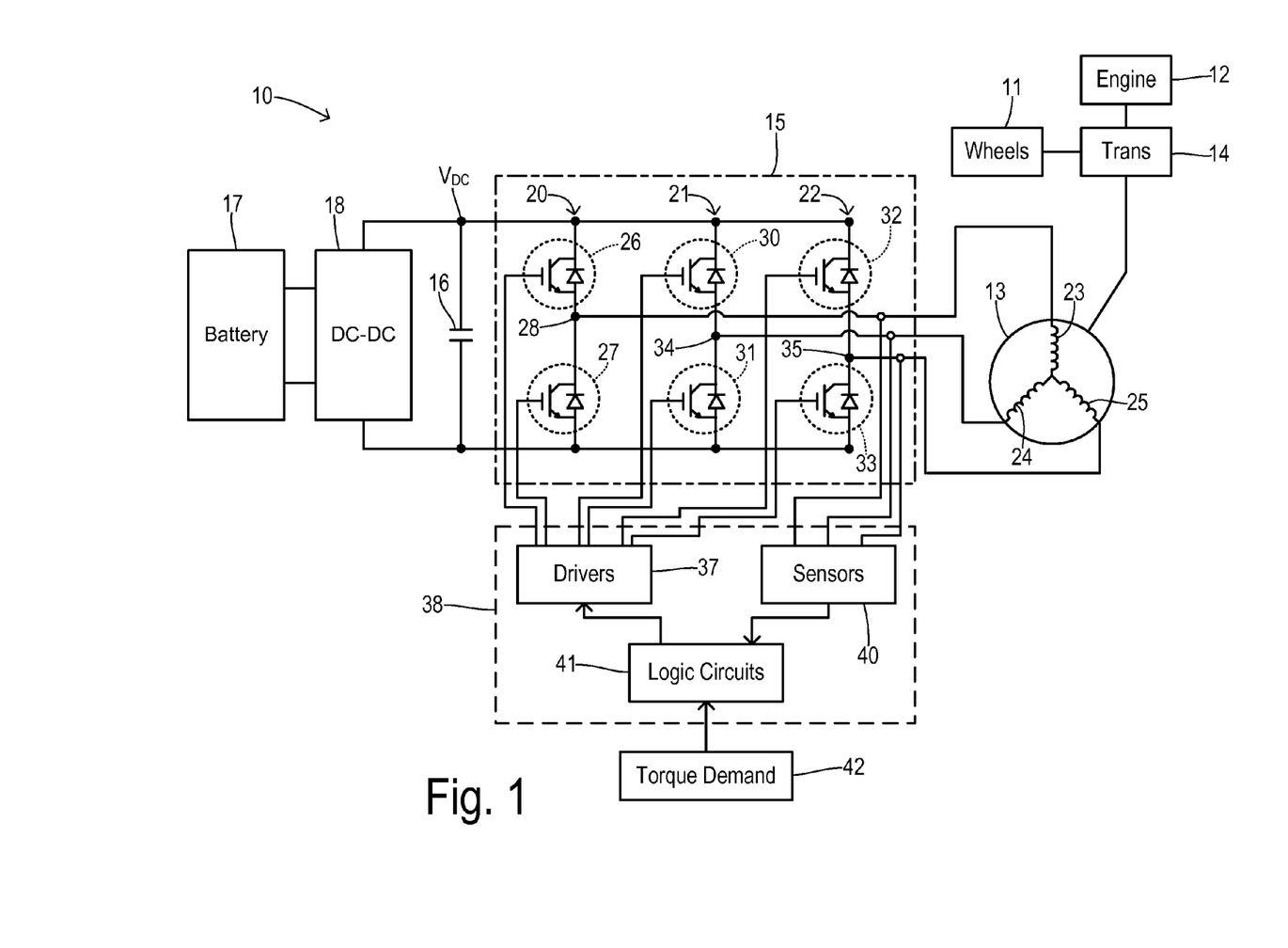
FIG. 1 is a schematic, block diagram showing a powertrain of an electrified vehicle according to one embodiment of the present invention.

FIG. 1 shows a hybrid electric vehicle 10 as one type of vehicle for implementing the shuffled dead time insertion of the present invention. Vehicle wheels 11 may be driven by an internal combustion engine 12 and/or by a traction motor 13 via a transmission 14. For providing electric propulsion, motor 13 may be driven via an inverter 15 that receives a DC link voltage at a DC link capacitor 16. The DC link voltage may result from conversion of DC power from a battery pack 17 by a converter 18 as known in the art.

Inverter 15 includes phase legs 20, 21, and 22 coupled to motor phase windings 23, 24, and 25. Phase leg 20 has an upper switching device 26 and a lower switching device 27 connected in series across DC link 16 and providing a junction 28 between devices 26 and 27 which is connected to winding 23 of motor 13. Similarly, phase leg 21 has upper switching device 30 and lower switching device 31, while phase leg 22 has upper switching device 32 and lower switching device 33. Junctions 34 and 35 are coupled to motor windings 24 and 25, respectively.

The switching devices may be comprised of IGBTs, antiparallel diodes, wide band gap FETs, or other devices. Each of the upper and lower switching devices has a respective gate terminal coupled to drivers 37 in a controller 38. Current sensors 40 measure the current flow through each phase winding. Measured current magnitudes are provided from sensors 40 to logic circuits 41 in controller 38 for use in determining PWM switching signals to be applied to the switching devices by drivers 37. As known in the art, the measured current may be compared with a desired motor current as determined according to a torque demand 42 that may be derived from operator input such as an accelerator pedal so that the operator can control the vehicle speed. Thus, current feedback determines a PWM duty cycle within logic circuits 41 that is then used to generate the timing of PWM switching signals for the phase leg switching devices.

Figure 2:
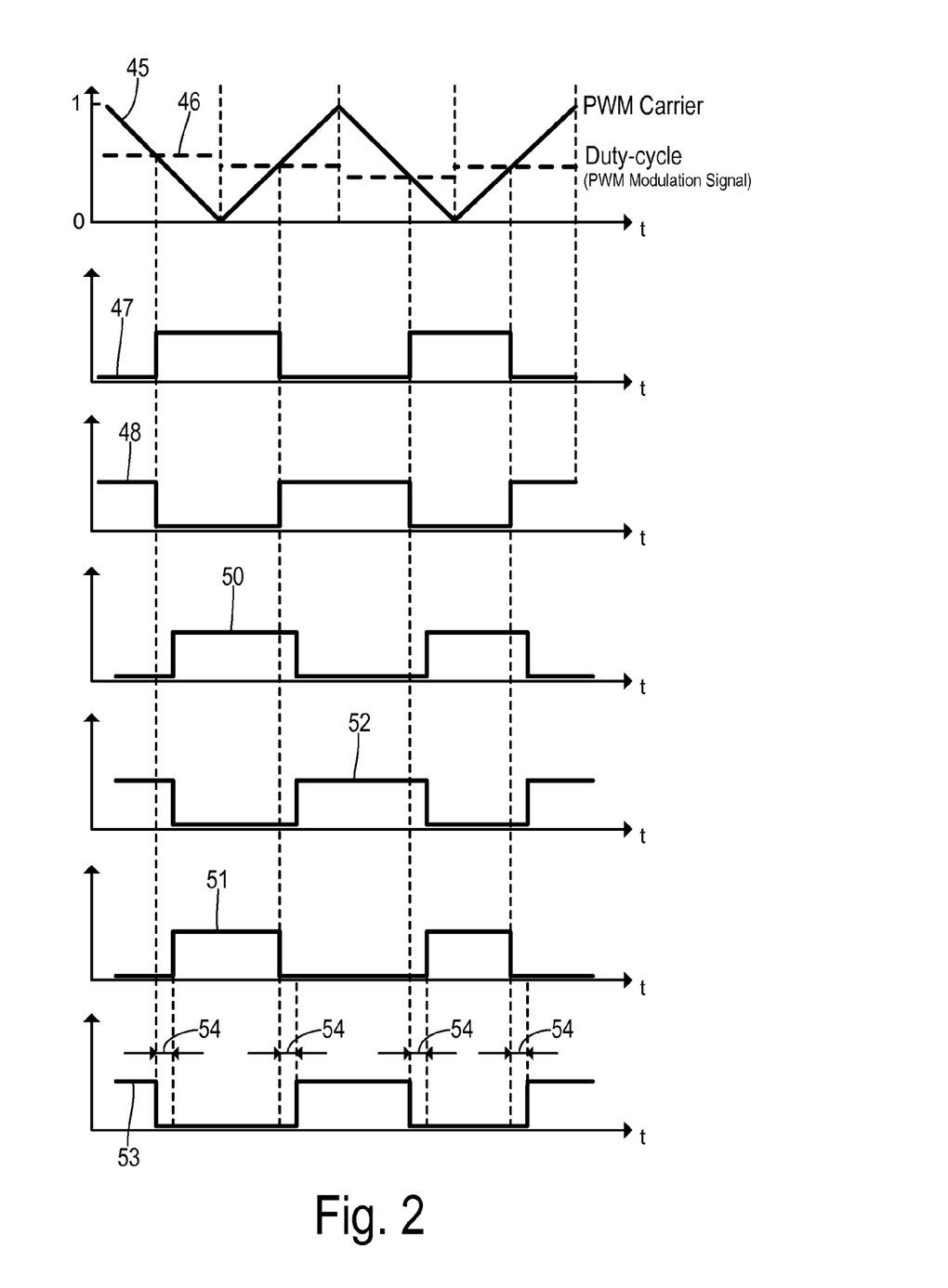
FIG. 2 is a waveform diagram showing the generation of original gate signals and gate signals with an inserted dead-time.

FIG. 2 shows a PWM carrier signal 45 which is generated as a triangle waveform at a high frequency (e.g., around 5 kHz) as compared to the rotation frequency of the motor. Using a known PWM method for generating gate-drive switching signals based on current-control, a PWM duty-cycle signal 46 is generated in response to any error between detected current and a target current. Duty-cycle 46 is compared with PWM carrier signal 45 to generate the PWM signals shown below in FIG. 2. A signal 47 is an original upper device gate signal $G_{UO}$ which has a low logic level when PWM carrier signal 45 is greater than duty cycle signal 46 and which has a high logic level when duty cycle signal 46 is greater than PWM carrier signal 45. A signal 48 shows an original lower device gate signal $G_{LO}$ which is the logical inverse of $G_{UO}$ signal 47.

To avoid shoot-through that could occur using original gate signals 47 and 48, dead-time insertion may be performed as follows. A waveform 50 is obtained by introducing a fixed time delay into signal 47. The fixed time delay represents a sufficiently long dead-time insertion that avoids simultaneous activation of both upper and lower switching devices that could occur as a result of noise or propagation delay differences between the upper and lower gate signals (typically having a duration of several microseconds). A dead-time-inserted upper switching device gate signal ($G_{UDI}$) 51 is obtained by forming a logical AND of original gate signal 47 and delayed gate signal 50 as shown. A signal 52 shows a time delayed version of lower gate signal 48 using the same fixed delay. A dead-time-inserted lower switching device gate signal ($G_{LDI}$) 53 is generated as a logical AND of original lower device gate signal 48 and delayed signal 52. In the prior art, dead-time inserted upper and lower gate signals 51 and 53 ($G_{UDI}$ and $G_{LDI}$), respectively, have been used to drive the phase leg switching devices under all conditions, i.e., with a dead time 54 being inserted at every switching event.

Figure 3:
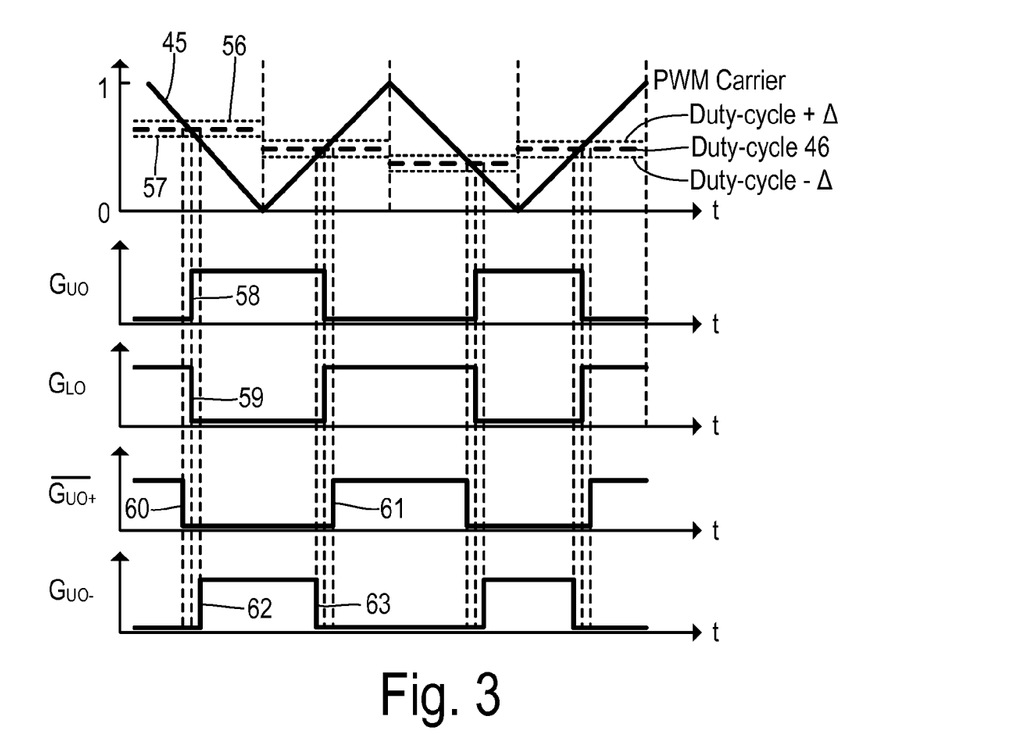
FIG. 3 is a waveform diagram showing an alternative technique for inserting a dead-time.

FIG. 3 illustrates an alternative method for generating the dead-time-inserted signals that does not require signal delay blocks as would be required for the technique shown in FIG. 3. Instead of using explicit signal delays, offset duty cycles 56 and 57 are obtained by adding and subtracting a fixed offset (denoted Δ) from duty cycle signal 46, and the offset values are used for comparison with the PWM carrier when generating the gate drive signals. Thus, the original upper and lower gate drive signals $G_{UO}$ and $G_{LO}$ are obtained in the usual way based on comparing duty cycle 46 with PWM carrier 45, which provides transitions 58 and 59 for the original signals. For generating the dead-time inserted signals, PWM carrier signal 45 is compared with the offset duty cycles as follows. To generate the lower gate dead-time inserted drive signal, PWM carrier 45 is compared with positive offset duty cycle 56 (i.e., to commanded duty cycle+Δ) and the result of the comparison is inverted. Thus, the lower gate drive signal with dead-time insertion $G_{LDI}$ is equal to an inverted upper gate drive signal $\overline{G_{UO+}}$ obtained using positive offset duty cycle 56. Lower gate signal $\overline{G_{UO+}}$ has transitions 60 and 61 coincident with the crossings of PWM carrier 45 with positive offset duty cycle 56. To generate an upper dead-time inserted gate drive signal $G_{UDI}$, the negative offset duty cycle 57 is used. Transitions 62 and 63 are shown for this signal which is also denoted $G_{UO-}$ since it is generated using the negative offset. Thus, by employing offsets to the duty cycle, changes in transition times for the gate drive signals are obtained which provide the dead-time intervals.

Co-pending U.S. application Ser. No. 14/601,282 (US Patent Application Publication 2016/0211772 A1), filed concurrently herewith, which is hereby incorporated by reference in its entirety, discloses the selective insertion of dead-time signals which depends upon the direction and magnitude of current flow in a phase leg. For a sufficiently positive phase current, an original, unmodified gate signal is used for the upper switching device while a dead-time-inserted gate signal is used for the lower switching device. For a sufficiently negative phase current, an original, unmodified gate signal is used for the lower switching device while a dead-time-inserted gate signal is used for the upper switching device. For an intermediate current, both switches utilize a dead-time-inserted gate signal. One objective of the present invention is to avoid the need to compare the measured current with the necessary thresholds to characterize whether the current is sufficiently positive or negative.

The current distortion caused by the dead-time insertion is dependent upon the particular amount by which the final duty-cycle used to drive the switching device is deviated from the original duty-cycle. Different processes for defining the dead-time may produce different deviations in the final duty-cycle from the original duty cycle. If $G_{UO}$ and $\overline{G_{UO+}}$ in FIG. 3 are used for the upper device and the lower device, respectively, there is no current distortion for the current flowing out of the junction between the upper and lower devices because this direction of current is controlled by the upper device and the upper device is receiving the original gate signal $G_{UO}$. In the meantime, this combination of gate signals results in current distortion for the current flowing into the junction between the upper and lower devices because this direction of current is controlled by the lower device and the lower device is not receiving the original gate signal $G_{LO}$. Similarly, if $G_{UO-}$ and $G_{LO}$ in FIG. 3 are used for the upper device and the lower device, respectively, there is no current distortion for the current flowing into the junction between the upper and lower devices but results in current distortion for the current flowing out of this junction. Instead of choosing the upper and lower gate signal combinations based on the current direction, the invention chooses (i.e., shuffles) a certain pattern of gate signal combinations so that the distortion caused by a wrong choice of the gate-signal combination with respect to the current direction can be spread out. As a result, less current distortion is achieved compared to the case using the conventional dead-time insertion and gate-signal combination of FIG. 2.

Figure 4:
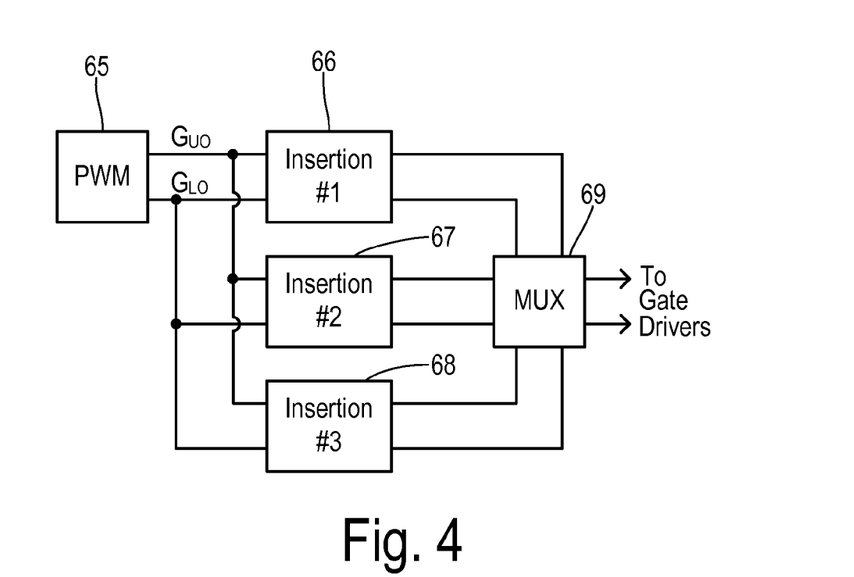
FIG. 4 is a block diagram showing generation of a plurality of alternate pairs sets of dead-time inserted gate signals that are shuffled by a multiplexer to select a gate drive signal to apply to the gate drivers of a phase leg.
Figure 5:
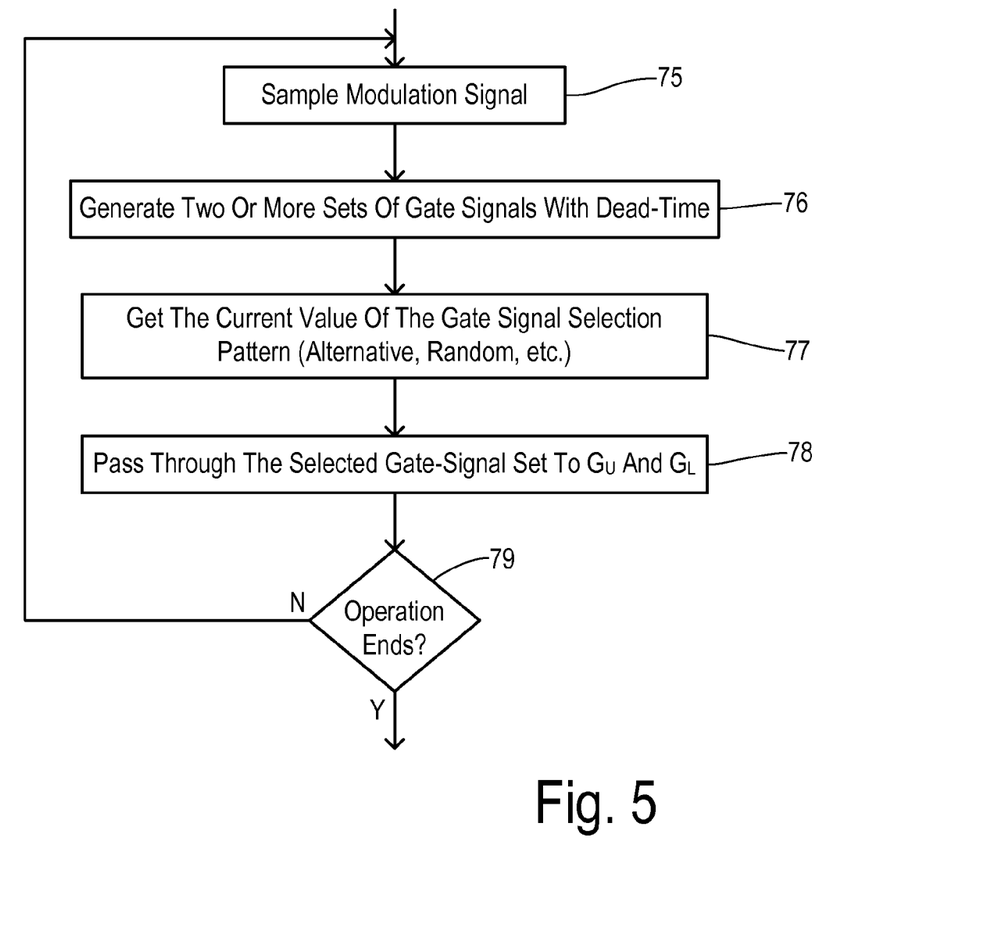
FIG. 5 is a flowchart showing one preferred method of the invention.

As shown in FIG. 4, a PWM controller 65 provides original gate drive signals $G_{UO}$ and $G_{LO}$ to dead-time insertion blocks 66-68 which provide respective paired sets of dead-time inserted signals for the upper and lower gate signals to respective inputs of a multiplexer 69. Each paired set of dead-time inserted signals corresponds to a different distortion of the current flowing in the load. For example, a first paired set of gate signals from first insertion block 66 may be comprised of deviating the duty-cycle of the upper switching device without any deviation in the duty-cycle of the lower switching device. A second paired set of gate signals from second insertion block 67 may be comprised of deviating the duty-cycle of the lower switching device without any deviating in the duty-cycle of the upper switching device. Meanwhile, a third paired set of gate signals from third insertion block 68 may be comprised of deviating the duty-cycles of both the upper and lower switching devices. Paired sets of dead-time-inserted gate signals can alternatively be generated by using different delay times in FIG. 2, different duty cycle offsets in FIG. 3, or by using other variations in the dead-time insertion timing by using different PWM carrier frequencies, different carrier signals (e.g., sawtooth instead of triangle wave), or different magnitudes for the duty cycle offset Δ in FIG. 3. Multiplexer 69 shuffles among the paired sets of dead-time inserted signals for the upper and lower gate signals according to a pattern that disperses the distortion.

Figure 6:
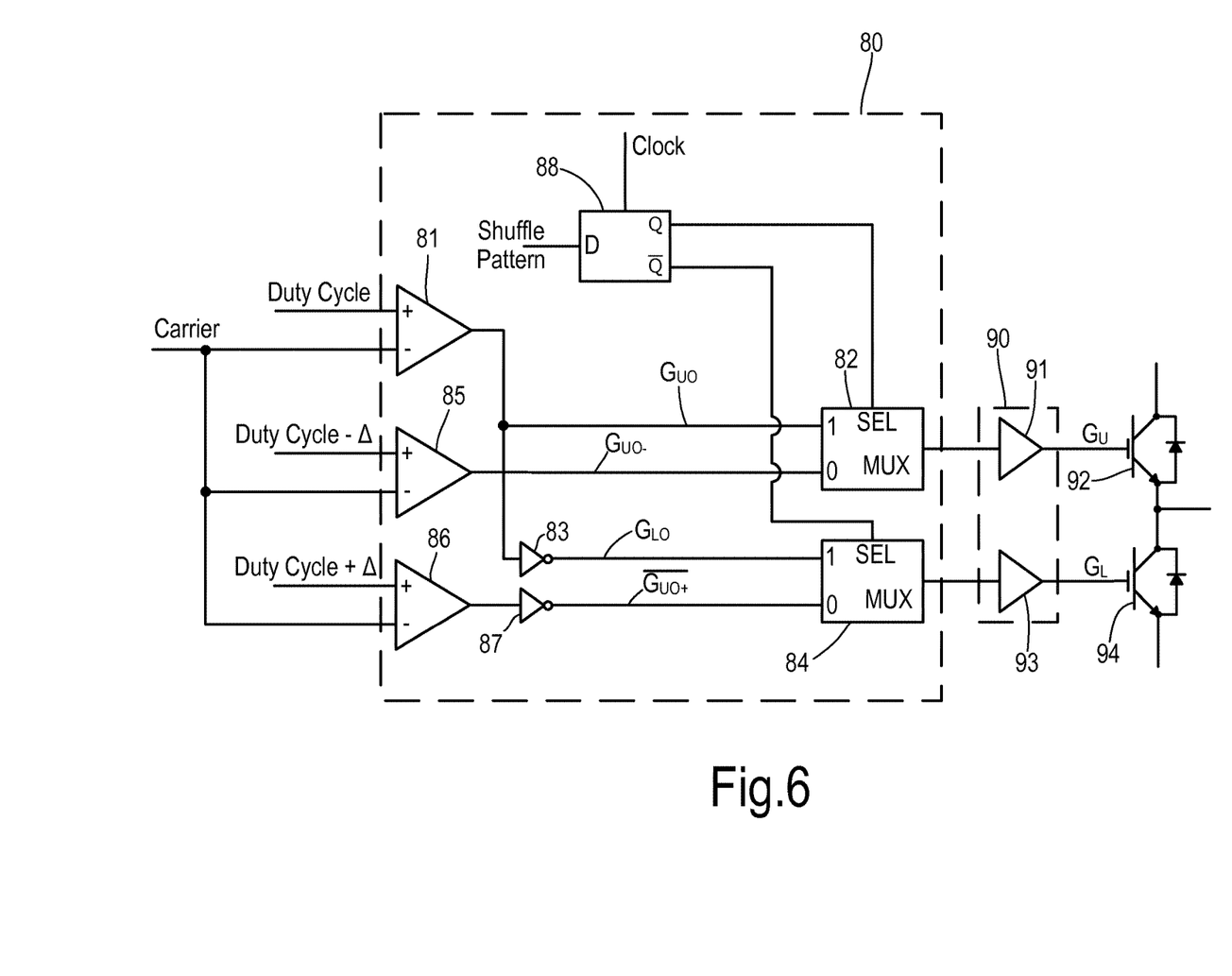
FIG. 6 is a schematic, block diagram showing a circuit for selecting alternate pairs of gate signals in greater detail.

A preferred method is summarized in FIG. 6 wherein a pulse width modulation signal is sampled in step 75. By comparing the PWM carrier signal with the duty cycle command, with the positive-offset duty cycle command (+Δ), and with the negative-offset duty cycle command (-Δ), two or more alternate paired sets of dead-time inserted gate signals are generated for the upper and lower switching devices. Shuffling of the paired sets is conducted by obtaining the current value of a gate signal selection pattern in step 77. The selection pattern can be any pattern that provides sufficient dispersion of the distortion. Preferred patterns include a repeating pattern or a random pattern. Repeating patterns include alternating (e.g., "<u>0</u>1010101 . . . ") or repeating blocks (e.g., "<u>1</u>101<u>0</u>0110<u>1</u>00110100 . . . "). A random pattern includes a quasi-random pattern based on a random number generator, for example. The selection pattern preferably switches between the available paired sets of dead-time-inserted signals at the PWM carrier frequency. The selected paired set is passed through to the gate drivers as gate signals $G_U$ and $G_L$ in step 78. A check is performed in step 79 to determine whether motor operation has ended. If not, then a return is made to step 75 to continue sampling the modulation signal, otherwise the method stops.

FIG. 7 shows a logic circuit 80 for shuffling the insertion of alternate pairs of dead-times according to one preferred embodiment of the invention. Logic circuit 80 may include dedicated electronic circuit components as shown or may be implemented using a programmable controller such as a microcontroller. A comparator 81 has a noninverting input receiving the duty cycle command signal (e.g. duty cycle signal 46 in FIG. 2). Comparator 81 has an inverting input receiving the PWM carrier signal. In response to the comparison, comparator 81 outputs an original upper gate drive signal $G_{UO}$ to a first input of a multiplexer 82. The first input is a one-selected input which passes through multiplexer 82 when a high logic level (binary "1") signal is present at a Select input (SEL) of multiplexer 82. In addition, the output of comparator 81 is inverted by an inverter 83 to provide an original lower gate drive signal $G_{LO}$ to a first (one-selected) input of a multiplexer 84.

A further pair of comparators 85 and 86 are provided for generating dead-time-inserted signals as follows. Comparator 85 receives a negative-offset duty cycle (duty cycle -Δ) at its noninverting input and receives the PWM carrier signal at its inverting input. The output of comparator 85 provides an upper dead-time-inserted gate signal $G_{UO-}$ to a zero-selected input of multiplexer 82. Comparator 86 receives a positive-offset duty cycle (duty cycle+Δ) at its noninverting input and receives the PWM carrier signal at its inverting input. The output of comparator 86 is inverted by an inverter 87 to provide a lower dead-time-inserted gate signal $\overline{G_{UO+}}$ to a zero-selected input of multiplexer 84.

A D-type flip-flop 88 receives a shuffle pattern at its D-input. A clock input receives a clocking signal (e.g., at a frequency equal to the PWM carrier signal) in order to alternate the Q and not Q outputs of flip-flop 88 so that the shuffle pattern and its inverse are coupled to the SEL inputs of multiplexers 82 and 84, respectively. When the shuffle pattern has a high logical level signal, multiplexer 82 selects the original upper gate drive signal $G_{UO}$ at the first input of multiplexer 82 for coupling to the input of an amplifier 91 in a driver circuit 90. Simultaneously, the inverted output (not Q) from flip-flop 88 provided to multiplexer 84 selects the dead-time-inserted lower gate drive signal $\overline{G_{UO+}}$ at the zero input of multiplexer 84 for coupling to the input of an amplifier 93 in driver circuit 90. When the shuffle pattern has a low logical level signal, the alternate pair of dead-time signals (i.e., $G_{LO}$ and $G_{UO}$) are selected and coupled to switching devices 92 and 94.

In the present invention, the paired sets of dead-time inserted signals correspond to a different distortion of the current flowing in the load (motor phase windings). In addition to dispersion of the distortion that results from alternating the chosen mode for forming the dead-time-inserted gate signals, the invention further reduces distortion whenever the chosen set of gate signals happens to use the original (i.e., unmodified) gate signal for a switching device that is then carrying a large current (as further explained in co-pending U.S. application Ser. No. 14/601,282).

What is claimed is:
1. A power converter comprising:
a DC link configured to receive a DC supply voltage;
a phase leg comprising an upper switching device and a lower switching device coupled across the DC link, wherein a junction between the upper and lower switching devices is configured to be coupled to a load;
a gate driver coupled to the phase leg activating the upper switching device according to an upper gate signal and activating the lower switching device according to a lower gate signal in response to a pulse-width modulation (PWM) control signal at a PWM frequency, wherein the upper gate signal and the lower gate signal are modified to form a first paired set of dead-time inserted signals and a second paired set of dead-time inserted signals, wherein the first and second paired sets of dead-time inserted signals correspond to different dead-time distortion of a current flowing to the load; and a logic circuit coupled to the gate driver that shuffles among the first and second paired sets of dead-time inserted signals for the upper and lower gate signals.

2. The power converter of claim 1 wherein the shuffling is comprised of alternately selecting the first and second paired sets following a predetermined repeating pattern.

3. The power converter of claim 2 wherein the predetermined repeating pattern switches from one paired set to the other paired set at the PWM frequency.

4. The power converter of claim 1 wherein shuffling is comprised of randomly selecting the paired sets.

5. A power converter comprising:

a DC link configured to receive a DC supply voltage;

a phase leg comprising an upper switching device and a lower switching device coupled across the DC link, wherein a junction between the upper and lower switching devices is configured to be coupled to a load;

a gate driver coupled to the phase leg activating the upper switching device according to an upper gate signal and activating the lower switching device according to a lower gate signal; and a controller 1) comparing a PWM carrier signal to a commanded duty cycle to generate original upper and lower gate drive signals, 2) generating a first paired set of dead-time inserted signals as modifications of the original upper and lower gate signals; 3) generating a second paired set of dead-time inserted signals as modification of the original upper and lower gate signals, wherein the first and second paired sets of dead-time inserted signals correspond to different distortion of a current flowing in the load; and 4) shuffling among the paired sets to activate the switching devices.

6. The power converter of claim 5 wherein the first paired set of dead-time inserted signals is comprised of 1) a modification of the original of one of the upper and lower gate signals to add a dead-time and 2) an unmodified original of the other of the upper and lower gate signals.

7. The power converter of claim 6 wherein a second paired set of dead-time inserted signals is comprised of 1) an unmodified original of the one of the upper and lower gate signals and 2) a modification of the original of the other of the upper and lower gate signals to add a dead-time.

8. The power converter of claim 5 wherein shuffling is comprised of selecting the paired sets following a predetermined repeating pattern.

* * * * *